United States Patent
Lee et al.

(10) Patent No.: US 7,705,936 B2
(45) Date of Patent: Apr. 27, 2010

(54) COLOR FILTERING DEVICE FOR IMPROVED BRIGHTNESS

(75) Inventors: Dong-Ho Lee, Yongin-si (KR); Yong-Ho Yang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 285 days.

(21) Appl. No.: 10/745,436

(22) Filed: Dec. 23, 2003

(65) Prior Publication Data

US 2004/0135937 A1     Jul. 15, 2004

(30) Foreign Application Priority Data

Dec. 31, 2002     (KR) .................... 10-2002-0087957

(51) Int. Cl.
    *G02F 1/1335*     (2006.01)
(52) U.S. Cl. .................... 349/109; 349/106; 349/107; 349/110; 349/114
(58) Field of Classification Search ............... 349/106, 349/107, 110, 111, 109, 114
    See application file for complete search history.

(56) References Cited

U.S. PATENT DOCUMENTS

| | | | | |
|---|---|---|---|---|
| 5,548,424 A * | 8/1996 | Takao et al. | ................. | 349/106 |
| 5,642,176 A * | 6/1997 | Abukawa et al. | ............ | 349/106 |
| 5,870,157 A | 2/1999 | Shimada et al. | ............ | 349/106 |
| 5,899,550 A * | 5/1999 | Masaki | ....................... | 349/109 |
| 5,936,693 A * | 8/1999 | Yoshida et al. | ............ | 349/139 |
| 6,081,309 A * | 6/2000 | Suzuki et al. | ............... | 349/106 |
| 6,215,538 B1 * | 4/2001 | Narutaki et al. | ............ | 349/106 |
| 6,552,764 B2 * | 4/2003 | Fujioka et al. | ............ | 349/106 |
| 6,573,960 B2 * | 6/2003 | Kobayashi et al. | ......... | 349/113 |
| 6,667,790 B2 * | 12/2003 | Yanagawa et al. | .......... | 349/139 |
| 6,721,028 B2 * | 4/2004 | Kim et al. | ................... | 349/141 |
| 6,734,931 B2 * | 5/2004 | Yu | ............................. | 349/106 |
| 6,809,784 B2 * | 10/2004 | Hsu et al. | ................... | 349/106 |

(Continued)

FOREIGN PATENT DOCUMENTS

JP     10-101217     4/1998

(Continued)

OTHER PUBLICATIONS

PCT International Search Report dated Apr. 12, 2004 corresponding to PCT/KR 2003/002844.

*Primary Examiner*—Richard H Kim
(74) *Attorney, Agent, or Firm*—Innovations Counsel LLP

(57) ABSTRACT

A color filtering member for improving the brightness of a display device is presented. The color filtering member includes colored regions (e.g., regions with RBG color filters) and black-and-white regions for transmitting white light. The black-and-white regions may be colorless gaps between adjacent colored regions. Multiple planarizing layers may be deposited on the colored regions and the black-and-white regions to form a surface that is sufficiently even. The color filtering member may include an intercepting region that extends between neighboring colored regions. The position of the intercepting region is not centered between the two colored regions that it separates. Rather, the intercepting region is shifted in the direction of rubbing (in the direction of liquid crystal alignment) to more effectively cover the regions where light leakage occurs. This color filtering member may be combined with an array member and a liquid crystal layer to form a display device.

21 Claims, 10 Drawing Sheets

U.S. PATENT DOCUMENTS

| | | | |
|---|---|---|---|
| 6,850,290 B1 * | 2/2005 | Song | 349/43 |
| 7,239,363 B2 * | 7/2007 | Park et al. | 349/109 |
| 2001/0019382 A1 * | 9/2001 | Song et al. | 349/106 |
| 2002/0171791 A1 | 11/2002 | Anno et al. | 349/113 |
| 2003/0122998 A1 * | 7/2003 | Iijima et al. | 349/106 |

FOREIGN PATENT DOCUMENTS

| | | |
|---|---|---|
| JP | 2002-229009 | 8/2002 |
| JP | 2002-328365 | 11/2002 |
| JP | 2002-373776 | 12/2002 |
| TW | 451082 | 8/2001 |
| TW | 475084 | 2/2002 |
| TW | 514593 | 12/2002 |

* cited by examiner

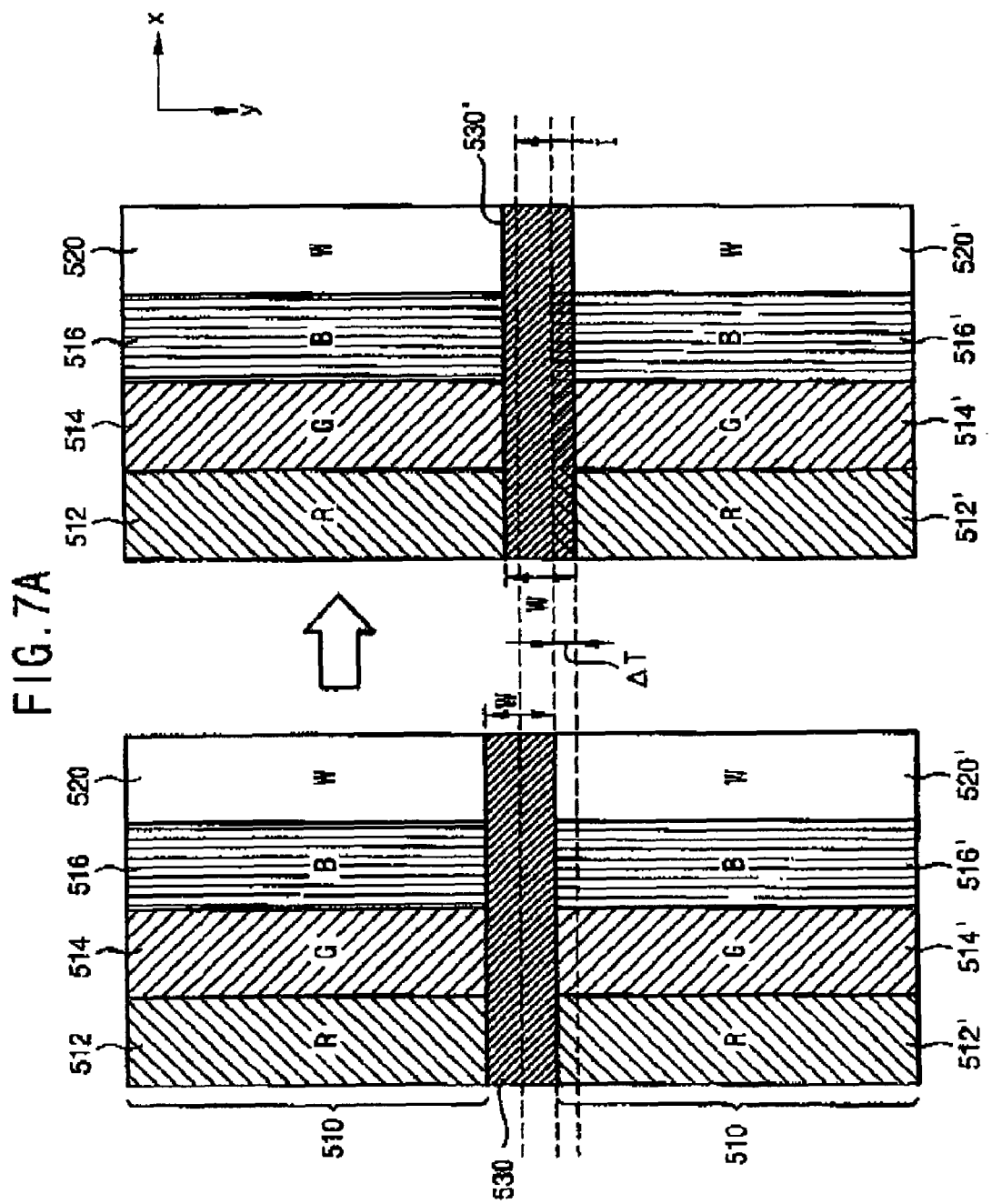

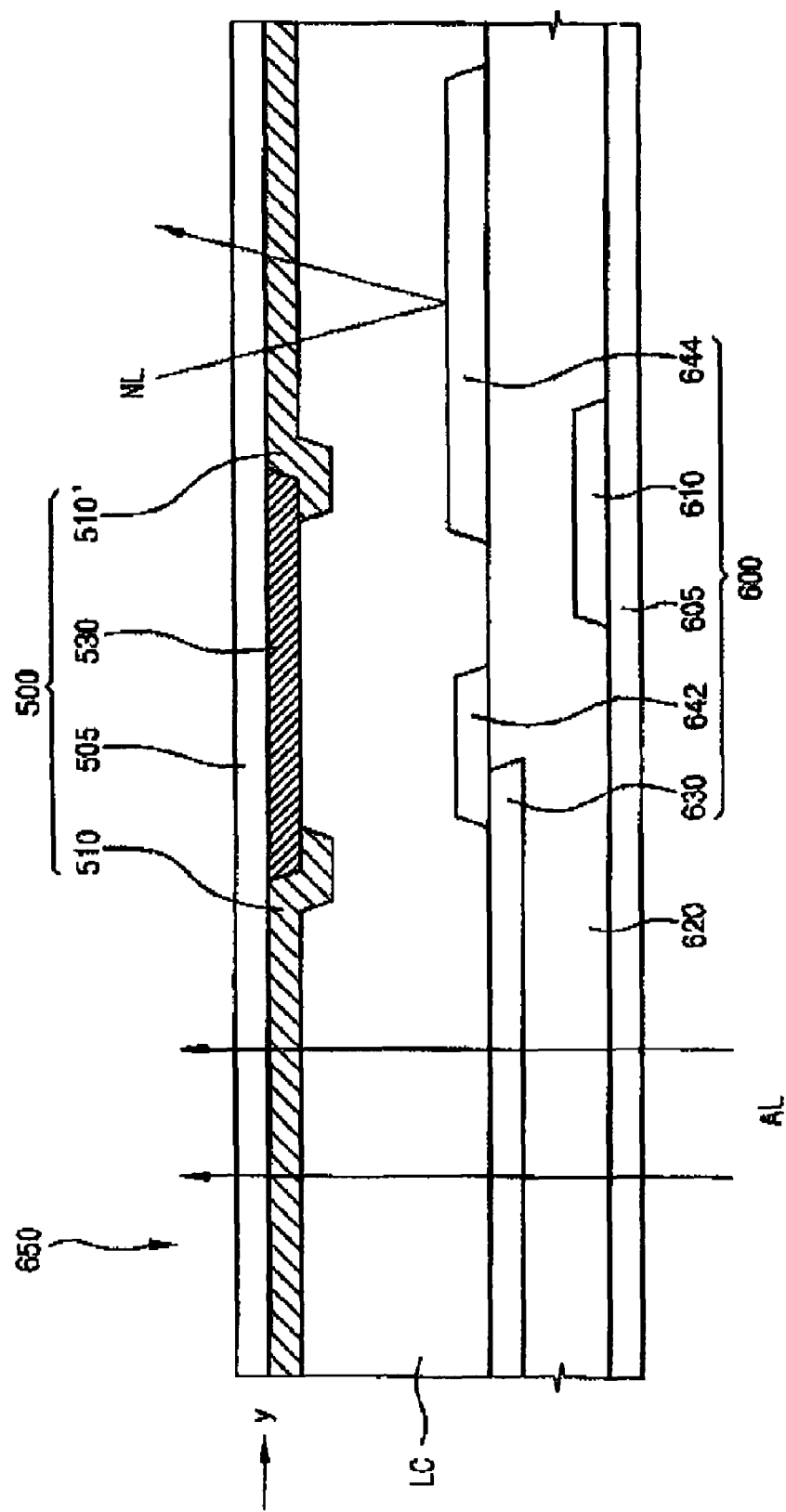

COLOR FILTERING DEVICE FOR IMPROVED BRIGHTNESS

CROSS-REFERENCE TO RELATED APPLICATION

This application relies for priority upon Korean Patent Application No. 2002-87957 filed on Dec. 31, 2002, the contents of which are herein incorporated by reference in its entirety.

BACKGROUND OF THE INVENTION

1. Field of the Invention

The present invention relates generally to a display device and more particularly to a color filtering member in the display device.

2. Description of the Related Art

An LCD apparatus generally includes an array substrate, a color filter substrate, and liquid crystals interposed between the array substrate and the color filter substrate. The liquid crystals have an anisotropic dielectric constant such that the LCD apparatus can display images by in response to variations in the electric field that is applied to the liquid crystals. The liquid crystals transmit different amounts of light depending on the intensity of the applied electric field.

LCD apparatus can generally be classified into three types: 1) a reflective type LCD apparatus that uses an external light, 2) a transmissive type LCD apparatus that uses an internal light, and 3) a trans-reflective type LCD apparatus that uses both external and internal lights.

FIG. 1 is a cross-sectional view showing a conventional transreflective type LCD apparatus.

Referring to FIG. 1, the conventional transreflective type LCD includes an array substrate 110, a color filter substrate 190 and liquid crystal interposed between the array substrate 110 and the color filter substrate 190.

The array substrate 110 includes a thin film transistor 120 formed on a surface of the array substrate 110. The color filter substrate 190 includes a common electrode 180.

The thin film transistor 120 includes a gate electrode 122, gate-insulation layers 123 and 124, an active pattern 125, a source electrode 126 and a drain electrode 127.

A transparent material, such as an acrylic organic layer 130, is formed on the thin film transistor 120 and the array substrate 140 with a predetermined thickness. In order to improve the brightness of the device, a surface of the acrylic organic layer 130 (e.g., the upper surface as shown in FIG. 1) is patterned to enhance diffusion of light. For example, the surface may be formed with concave and/or convex portions. Also, the acrylic organic layer 130 has an opening that exposes the drain electrode 127.

A transmissive electrode 140 for transmitting internal light and a reflective electrode 160 for reflecting external light are successively formed on the acrylic organic layer 130. An insulating layer 150 is formed between the transmissive electrode 140 and the reflective electrode 160. The reflective electrode 160 and the insulating layer 150 are deposited discontinuously to form an opening 165 through which internal light is transmitted. The transmissive electrode 140 typically includes ITO (Indium Tin Oxide) or IZO (Indium Zinc Oxide), and the reflective electrode 160 typically includes aluminum or aluminum-neodymium alloy.

The color filter substrate 190 having the common electrode 180 is disposed on the array substrate 110 and the liquid crystal 170 is positioned between the array substrate 110 and the color filter substrate 190 to form a transreflective type LCD.

Popular uses for LCDs include portable or handheld applications. While handheld applications generally require low power consumption due to their reliance on batteries as the power source, it is also desirable to provide high brightness, which increases power consumption. In order to satisfy these two demands that conflict with each other, a new method of lowering power consumption without sacrificing brightness level is desired.

Various methods have been adopted in an attempt to enhance brightness without significantly increasing power consumption. For example, the number of lamps or optical sheets that are used with an internal light source have been increased, the twist angle of liquid crystals has been varied, and black matrix has been removed from the color filter substrate. A black matrix is a light-shielding film that is typically positioned between different-colored pixels to keep the colors dearly separated. However, these methods tend to be accompanied by one or more undesirable side effects, such as an increased cost of manufacture or lowered contrast ratio, both of which adversely affect the reliability of an LCD apparatus.

FIG. 2 is a cross-sectional view of a currently available color filter substrate that does not include black matrix. The color filter substrate 200 of FIG. 2 includes an intercepting region 220, such as a black matrix, and a color filter 230 having R, G and B color filters 232a, 234a and 236a. The intercepting region 220 is formed on an area surrounding a display area, which is where the R, G and B color filters 232a, 234a and 236a are formed. While the intercepting regions that are typically located between the R, G and B color filters 232a, 234a and 236a are removed from the color filter substrate 200, the effect of the intercepting regions is achieved by partially overlapping the R, G and B color filter 232a, 234a and 236a that are adjacent to each other. The overlapped portions of the color filters function as the black matrix, thereby improving the brightness of the LCD apparatus.

The color filter substrate 200 includes a planarizing layer 240 formed on the color filter 230 to provide a substantially flat surface. The planarizing layer 240 is needed partly because the surface formed by the partially-overlapping color filters is more rugged than what is desirable for formation of the common electrode 250. Once a desired level of flatness is achieved by deposition of the planarizing layer 240, a common electrode 250 formed on the planarizing layer 240. A spacer 262 is formed on the common electrode 250 for maintaining a uniform colorless gap between the color filter substrate 200 and an array substrate 110 (see FIG. 1) when the two substrates are combined.

As shown in FIG. 2, however, the planarizing layer 240 does not provide an even surface that is desired for deposition of the common electrode 250. When the color filter substrate 200 having a non-flat surface is assembled into an LCD apparatus, light tends to leak through the sloped portions of the common electrode 250, reducing the brightness level. In order to achieve the goal of improving brightness without a significant increase in the power consumption level, methods are needed to minimize this light leakage.

BRIEF SUMMARY OF THE INVENTION

The present invention includes a color filtering device for improving brightness and a display device made with such color filtering member. The color filtering device includes a substrate with a first colored region and a second colored region formed thereon, wherein the second colored region is positioned a predetermined distance away from the first colored region in a first direction, forming a colorless gap. The colorless gap between the first and second colored regions to functions as a black-and-white region for transmitting white light. A third colored region is formed on the substrate such that it is positioned away from the first colored region in a second direction. An intercepting region is positioned between the first colored region and the third colored region, and the first and the third colored regions have different lengths. "Length" is the distance from the intercepting region to an edge of the colored region that is farthest from the intercepting region. A planarizing layer is deposited on the colorless gap and the first and the second colored regions.

In another aspect, the invention includes a display device that includes the above color filtering device. An exemplary embodiment of the display device includes a first substrate, a first colored region formed on the first substrate, and a second colored region formed on the first substrate, wherein the second colored region is positioned a predetermined distance away from the first colored region in a first direction, thereby forming a colorless gap between the first and second colored regions for transmitting white light substantially without wavelength-based filtration. A third colored region is formed on the substrate positioned away from the first colored region in a second direction. An intercepting region is positioned between the first colored region and the third colored region for separating the first and the third colored regions. A first planarizing layer is deposited on the colorless gap and on the first and the second colored regions. A second substrate is coupled to the first substrate and a liquid crystal layer is interposed between the first substrate and the second substrate. Signal lines and transistors are formed on the second substrate. The first colored region and the second colored region are aligned along a first direction with the colorloss gap separating the first colored region and the second colored region. The first and third colored regions have different lengths, wherein the length is the distance from the intercepting region to an edae of a colored region that is farthest from the intercepting region.

The invention also includes making the above color filtering device. The method includes forming colored regions on a substrate, forming black-and-white regions on the substrate such that the black-and-white regions separate the colored regions that are arranged along a first direction. Each of the black-and-white regions comprises a colorless gap for transmitting white light. The method also includes forming an interception region for separating the colored regions that are arranged in a second direction. The intercepting region substantially blocks light, and the colored regions that are separated by the intercepting region have different lengths. "Length" is measured from the intercepting region to an edge of a colored region that is farthest away from the intercepting region. A first planarizing layer is deposited on the colored regions and the black-and-white regions such that the first planarizing layer is adjacent to the substrate in the colorless gap.

Another method of making a color filtering device includes forming a first colored region on a substrate, forming a second colored region on the substrate, and forming an intercepting region on the substrate such that the intercepting region separates the first and the second colored regions. The intercepting region is positioned such that the first colored region is longer than the second colored region. "Length" is a distance from the intercepting region to an edge of a colored region that is farthest from the intercepting region.

BRIEF DESCRIPTION OF THE DRAWINGS

The above and other advantages of the present invention will become readily apparent by reference to the following detailed description when considered in conjunction with the accompanying drawings wherein:

FIG. 7A is a schematic view showing an LCD apparatus for preventing leakage of light;

FIG. 7B is a cross-sectional view of the LCD apparatus shown in FIG. 7A; and

DETAILED DESCRIPTION OF THE INVENTION

As used herein, a first material being "formed on" a second material means the first and the second material are physically coupled, directly or indirectly. A "step difference," as used herein, indicates the degree of unevenness of a surface caused by underlying regions' having different thicknesses. "White light," as used herein, refers to light that appears substantially colorless to the naked eye, usually having a wide range of wavelengths.

Figure 1:
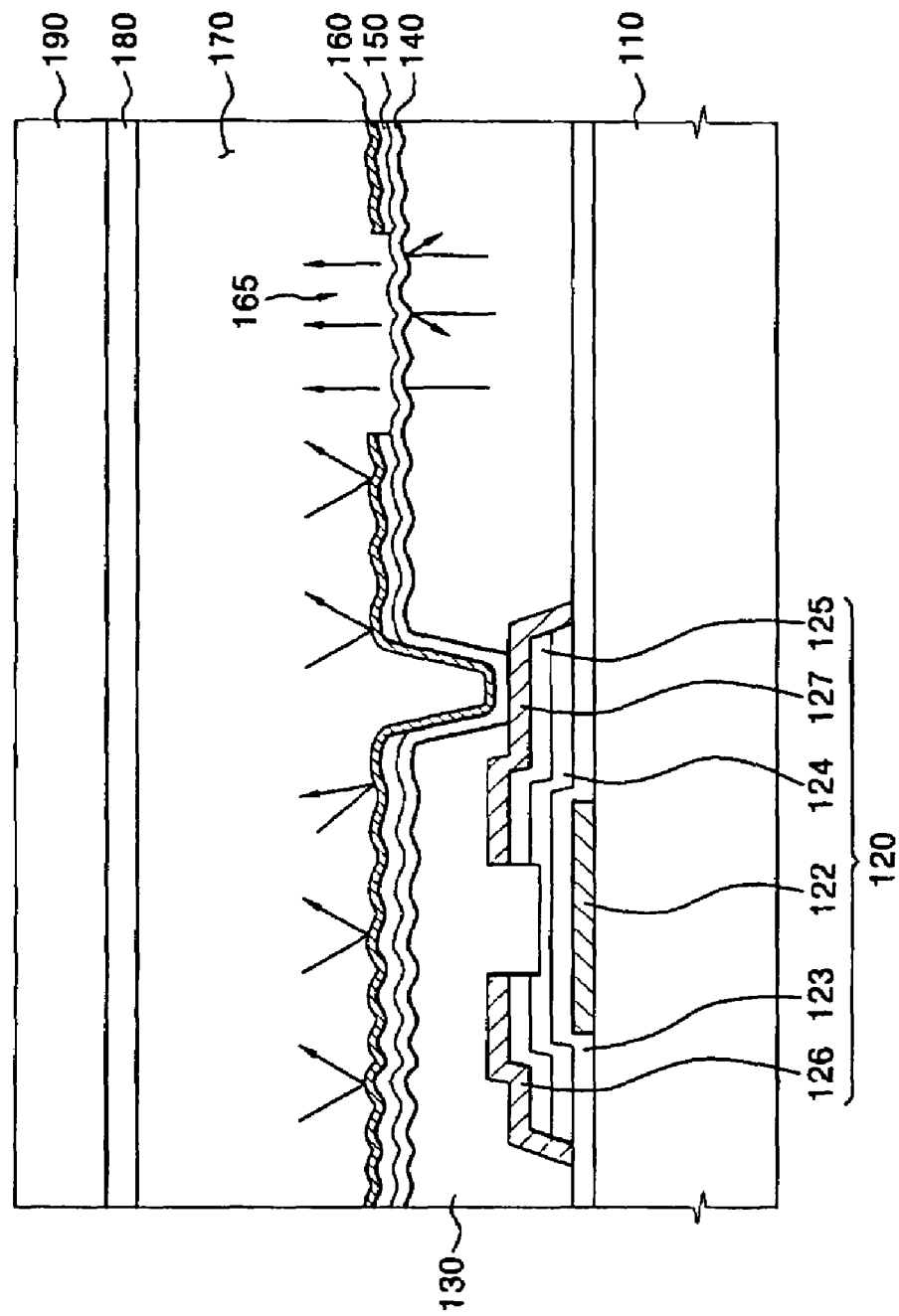
FIG. 1 is a cross-sectional view showing a conventional transreflective type LCD apparatus.
Figure 2:
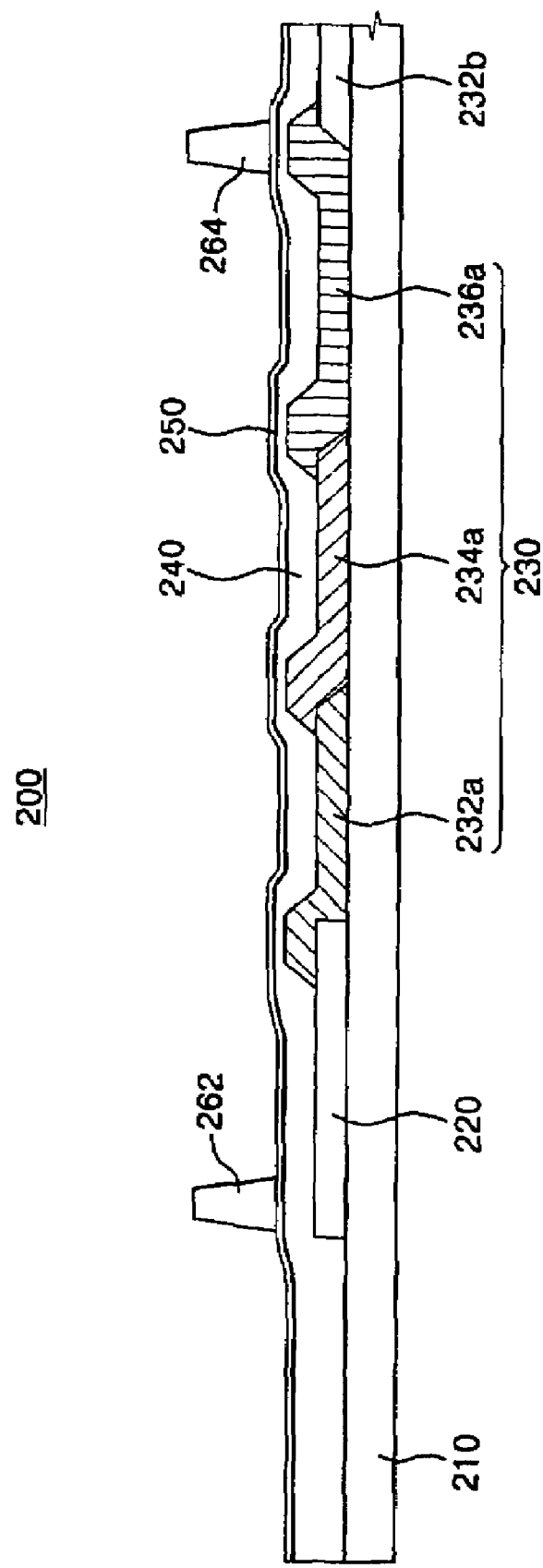
FIG. 2 is a cross-sectional view showing a currently available color filter substrate from which a black matrix is removed.
Figure 3A:
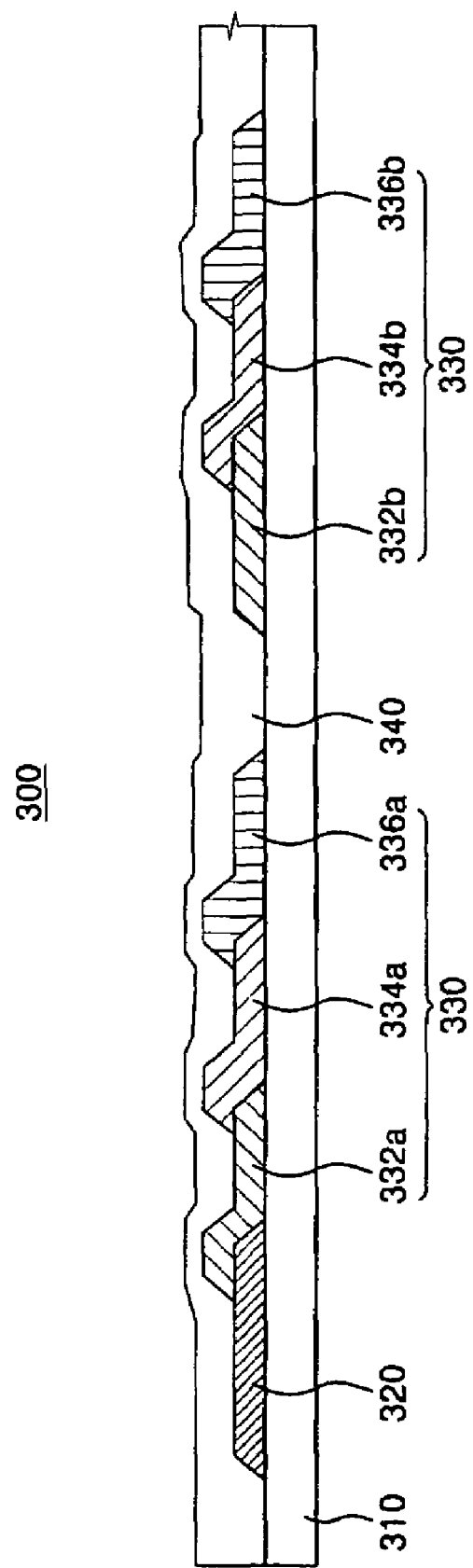
FIGS. 3A and 3B are cross-sectional views of a color filter substrate according to an exemplary embodiment of the present invention.
Figure 3B:
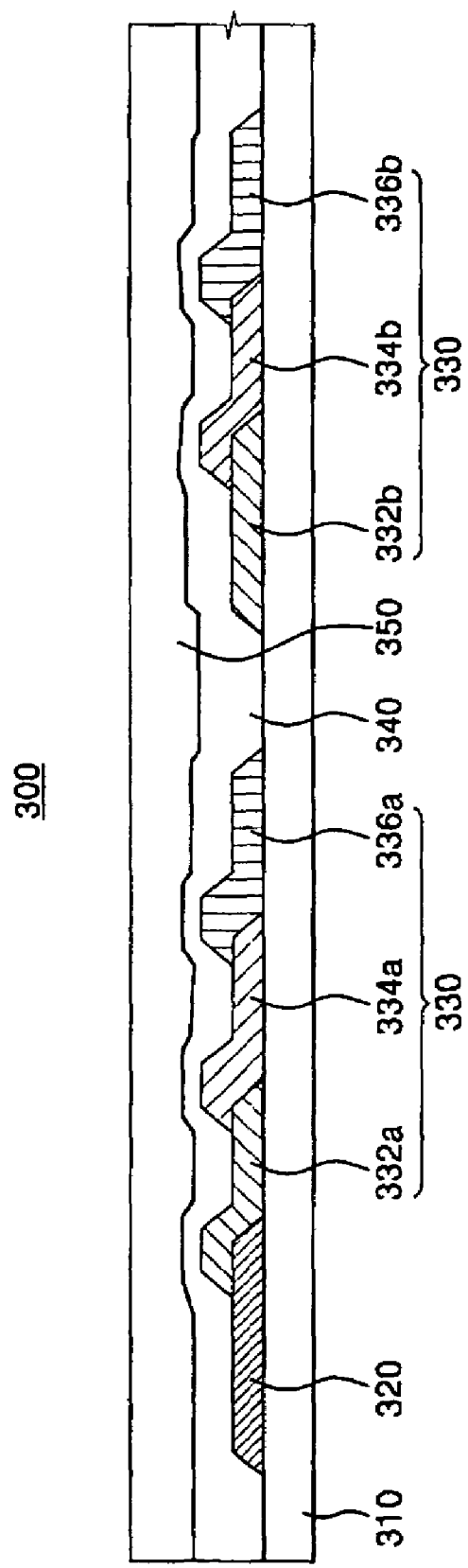

FIGS. 3A and 3B are cross-sectional views showing a method of fabricating a color filter substrate according to an exemplary embodiment of the present invention. In FIGS. 3A and 3B, a color filter substrate that reduces the step difference between color filters will be described.

Referring to FIGS. 3A and 3B, a color filtering member 300 includes a first substrate 310, a color filter layer 330 having a plurality of color filters 332a, 334a, 336a, 332b, 334b and 336b, a black matrix 320, a first planarizing layer 340 and a second planarizing layer 350. The first substrate 310 may include an insulating layer. Black matrix 320 is formed along the outer edges of the insulating layer 310. The color filters 332a, 334a, 336a, 332b, 334b and 336b, which selectively transmit light based on its wavelength, form a colored region on the first substrate 310. A colorless gap between the colored regions, such as the colorless gap between the color filter 336a and the color filter 332b of FIG. 3A where the first substrate 310 is exposed, forms a black-and-white region that transmits light without wavelength-based filtration.

The boundaries of the black-and-white region are defined by the color filters 332a, 334a, 336a, 332b, 334b and 336b. In order to improve the contrast ratio of the displayed image, the adjacently positioned color filters are partially overlapped. The overlapped portions of the color filters 332a, 334a, 336a, 332b, 334b and 336b effectively function as the black matrix 320.

To reduce the step difference caused by the color filters 332a, 334a, 336a, 332b, 334b and 336b and the black-and-white region, the first planarizing layer 340 is formed over the insulating substrate 310. In this exemplary embodiment, the first planarizing layer 340 may include a material having a low viscosity, such as an organic material, thereby preventing the color filter layer 300 from being damaged and a colorant of the color filter layer 300 from leaking/spreading. After the first planarizing layer is deposited (e.g., with a constant spin speed), the first planarizing layer is cured through a baking process.

As shown in FIG. 3B, the second planarizing layer 350 is formed on the first planarizing layer 340 to further even out the first planarizing layer 340 and reduce the step difference. The second planarizing layer 350 may include a material having a low viscosity, such as the organic material, which may be the same as or different from the material used for the first planarizing layer 340.

An alternative way of reducing the step difference entails using photolithography. However, the double-planarizing-layer method described above can achieve substantially the same result without additional photoresist and photolithography processes.

FIGS. 3A and 3B are cross-sectional views of a color filtering member 300 including the color filters 332a, 334a, 336a, 332b, 334b and 336b and the black-and-white region. These figures show the color filtering member 300 according to one embodiment of the invention wherein the black-and-white region is a colorless gap between neighboring colored regions. Since there is no layer between the first planarizing layer 340 and the first substrate 310 in the colorless gap, the step difference caused by the presence of the colorless gap is relatively large. Thus, even after depositing the first planarizing layer 340, the surface of the planarizing layer 340 is still not sufficiently even to form an electrode thereon. The second planarizing layer 350 covers up the unevenness of the first planarizing layer 340 to achieve a sufficiently smooth surface.

Figure 4:
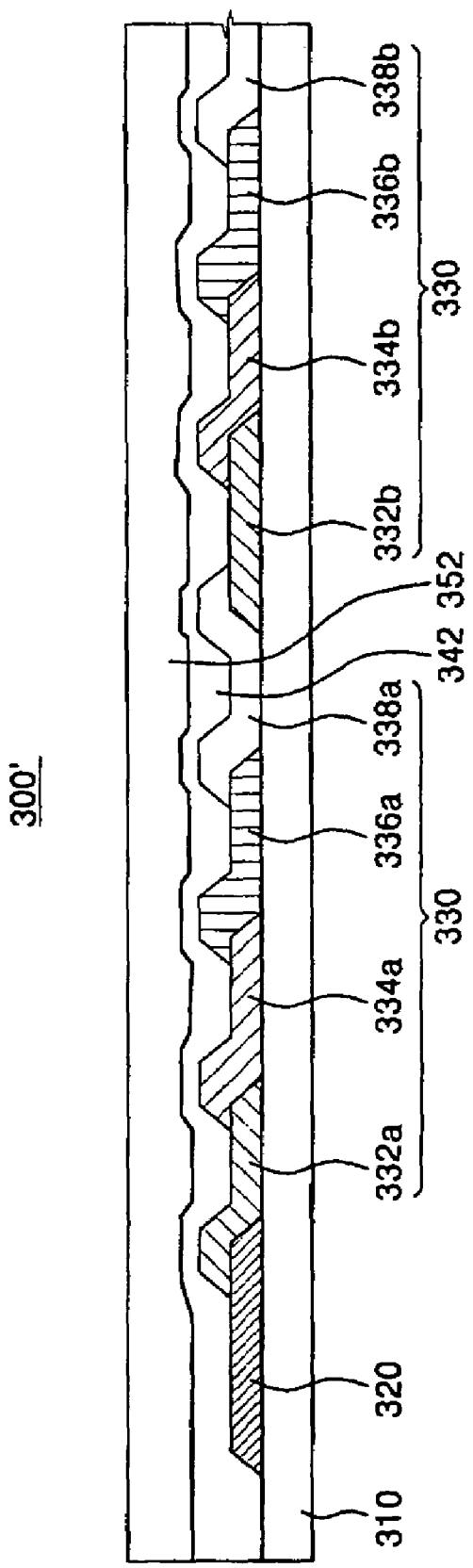
FIG. 4 is a cross-sectional view of a color filter substrate according to another exemplary embodiment of the present invention.

FIG. 4 is a cross-sectional view of the color filtering member 300' according to another embodiment of the present invention. The color filtering member 300' includes components having substantially similar structure and function as in those of the color filtering member 300 of FIGS. 3A and 3B, as indicated by the use of the same reference numerals. Unlike the color filtering member 300, the color filtering member 300' includes a white pixel 338a formed in the colorless gap between the neighboring colored regions. The white pixel 338a transmits substantially all incident light without wavelength-based filtration. The presence of the white pixel 338a reduces the step difference that needs to be compensated by the planarizing layers. In this embodiment, the fourth planarizing layer 352 may not be necessary because the white pixels 338a and 338b contribute to reducing the step difference.

In yet another embodiment, the colorless gap between the colored region is filled with an insulating block made of the a transparent insulating material, such as the material that is used for the planarizing layer 340. This insulating block may be deposited by a well-known method such as spin coating and shaped to fill the colorless gap. Preferably, this insulating block is about the same height as the color filters, so that one planarizing layer can achieve a substantially flat surface.

The color filtering member 300' includes the first substrate 310, the color filter layer 330 having a colored region and a black-and-white region, a black matrix 320, a third planarizing layer 342 and a fourth planarizing layer 352. The third planarizing layer 342 and the fourth planarizing layer 352 may be made of the same material as the first and second planarizing layers 340, 350, such as a low-viscosity organic material. The colored region includes first color filters 332a, 334a, 336a, 332b, 334b and 336b for transmitting red, green, and blue colors. The color filters are prepared by mixing a transparent resin with a dye or a pigment, and the black-and-white region includes white pixels 338a and 338b having a transparent resin so as to define a white color.

The color filters 332a, 334a, 336a, 332b, 334b and 336b are formed in the colored region of the substrate 310 and the white pixels 338a and 338b are formed on the black-and-white region of the substrate 310. The black matrix 320 is formed near an edge of the first substrate 310 but not between the color filters 332a, 334a, 336a, 332b, 334b and 336b and the white pixels 338a and 338b. The white pixels 338a and 338b partially overlap the neighboring color filters to form a "separation region" that functions like a black matrix, thus improving the contrast ratio.

Figure 5:
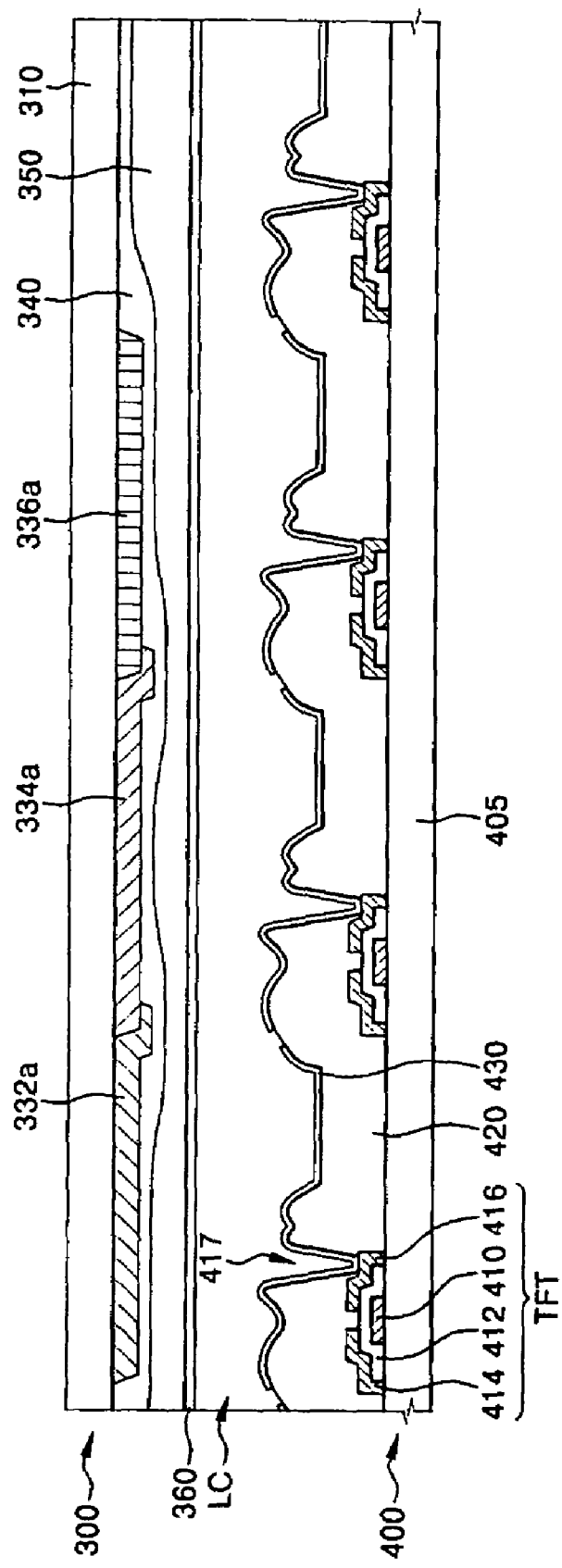
FIG. 5 is a cross-sectional view showing an LCD device according to an exemplary embodiment of the present invention.

FIG. 5 is a cross-sectional of an a liquid crystal display (LCD) apparatus according to an embodiment of the present invention.

Referring to FIG. 5, an LCD apparatus includes a color filtering member 300, an array member 400, liquid crystal interposed between the color filtering member 300 and the array member 400, and a backlight assembly (not shown) disposed under the array member 400 to generate an artificial light. The color filtering member 300 includes a first substrate 310, which is a transparent substrate with or without an insulating layer. The color filtering member 300 also includes a black matrix (not shown) formed on the first substrate 310, color filters 332a, 334a and 336a, a first planarizing layer 340, a second planarizing layer 350, and a transparent electrode layer 360.

The black matrix may be an intercepting region or a black mask, and is formed along a portion of the first substrate 310 to intercept light passing through an area that frames what is generally considered to be the display area.

Each of the color filters 332a, 334a and 336a is associated with a specific color and includes a transparent resin using a colorant, such as a dye or a pigment. The color filters 332a, 334a and 336a may be associated with the three primary colors (red, green, and blue), or complementary colors.

The first planarizing layer 340 is formed over the transparent substrate 310 to coat the color filters 332a, 334a and 336a, thereby protecting the color filters 332a, 334a and 336a from various environmental factors and physical forces. The planarizing layer 340 also helps contain the colorant in the color filters 332a, 334a and 336a, preventing the colorant from undesirably spreading to neighboring parts.

The second planarizing layer 350 is formed on the first planarizing layer 340 to further even out the surface, substantially eliminating any bumps or dips caused by the step difference between the first color filters 332a, 334a and 336a and the white pixel or the colorless gap.

The transparent electrode layer 360 including ITO (Indium Tin Oxide) is formed on the second planarizing layer 350, which is even enough to allow the electrode formation.

Although not shown in FIG. 5, the color filtering member 300 may further include a transparent hardened passivation layer formed on the transparent electrode layer 360 so as to prevent upper and lower electrodes from being shorted due to impurities. The transparent hardened passivation layer includes $SiO_2$, $TiO_2$ and so on. An alignment layer (not shown) including a polyimide resin is formed on the transparent hardened passivation layer and rubbed to align the liquid crystals. As is well known, the alignment of the crystals is set by the rubbing direction.

The array member 400 includes an insulating layer 405 and a plurality of gate lines (not shown) and data lines (not shown) formed thereon to create pixels arranged in a matrix configuration. Formation of gate lines and data lines is well known. Each of the pixels has a switching device, e.g., a Thin Film Transistor (TFT), that is connected to corresponding gate and data lines. The array member 400 is combined with the color filtering member 300 to contain the liquid crystal LC therebetween.

Particularly, a gate pattern including a single metal layer or a double metal layer having chromium (Cr), aluminum (Al), molybdenum (Mo) or molybdenum tungsten (MoW) is formed on the insulating substrate 405. The gate pattern includes a gate line extending in one direction, a gate pad (not shown) connected to an end of the gate line so as to receive a scan signal from an external source and provide the scan signal to the gate line and a gate electrode 410 of the TFT.

The array member 400 includes a gate-insulation layer (not shown) including an inorganic material, such as silicon nitride, formed on the gate line and the insulating layer 405. An active pattern 412 comprising polycrystalline silicon is formed on the gate-insulation layer corresponding to the gate electrode 410.

The array member 400 includes a data pattern having a metal layer and formed on the active pattern 412 and the gate-insulation layer. The data pattern includes a first electrode (or a source electrode) 414 overlapping a first area of the active pattern, a second electrode (or a drain electrode) 416 overlapping a second area of the active pattern, a data line connected to the source electrode 414 and extending in a direction substantially perpendicular to the direction in which the gate line extends, and a data pad (not shown) connected to an end of the data line to relay an image signal from an external source to the TFT.

The array member 400 includes an organic layer 420, for example, such as an acrylic resin, formed on the data line and the gate-insulation layer with a predetermined thickness. The organic layer 420 includes a pattern (e.g., a pattern of convex and concave portions) formed on a surface thereof such that the surface of the acrylic organic layer 420 diffuses the light, thereby improving the brightness. Also, the organic layer 420 is provided with a via-hole 417 by partially opening the organic layer 420 to expose the drain electrode 416.

To control the alignment of the liquid crystal LC, the array member 400 includes a pixel electrode 430 formed on the organic layer 420 and connected to the drain electrode 416 through the via-hole 417. The pixel electrode 430 includes ITO or IZO, depending on the embodiment. The pixel electrode 430 receives an image signal from the TFT and generates an electric field with the common electrode (not shown) of the color filtering member 300. The pixel electrode 430 is formed within a pixel area defined by the gate and data lines. Sometimes, to increase the reflective area by increasing the electrode surface, the pixel electrode 430 extends beyond the boundaries delineated by the gate and date lines and overlays the gate and data lines.

Although not shown in FIG. 5, a reflecting layer may be formed on the pixel electrode 430 and a spacer is disposed between the color filtering member 300 and the array member 400 so as to maintain a cell colorless gap between the color filtering member 300 and the array member 400. Any well-known spacers, such as a spacer having a ridged shape or a ball shape, may be used. Methods of forming spacers in a display device are well known.

Figure 6:
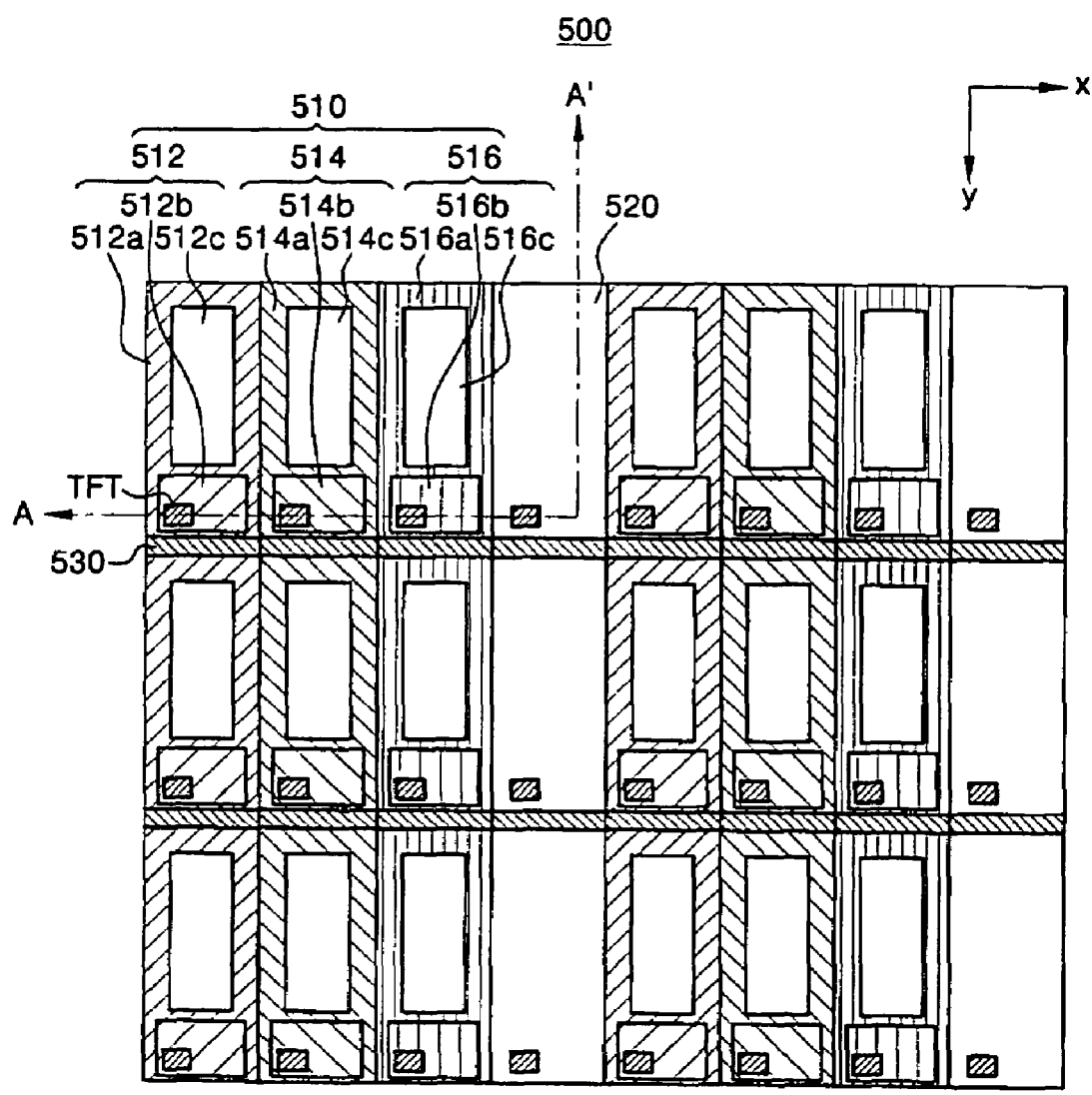
FIG. 6 is a schematic view showing a color filter substrate according to another exemplary embodiment of the present invention.

FIG. 6 is a top view of an alternative color filtering member 500 according to another embodiment of the present invention. In this embodiment, the alternative color filtering member 500 includes an intercepting region 530. In more detail, the color filtering member 500 includes a colored region 510 that includes red, green, and blue (RGB) color filters, a black-and-white region 520 for transmitting white light, and an intercepting region 530 dividing two colored regions 510 that neighbor each other in the y-direction according to the coordinates shown in the Figure. The black-and-white region 520, which extends in the y-direction, separates the colored regions that neighbor each other along the x-direction according to the coordinates of the Figure.

The colored region 510 includes an R color filter 512 for transmitting red light, a G color filter 514 for transmitting green light, and a B color filter 516 for transmitting blue light. The R color filter area 512 includes a first reflecting area 512a on which a corresponding color filter is formed with a first thickness, a second reflecting area 512b on which a corresponding color filter is formed with a second thickness thinner than the first thickness, and a transmitting area 512c on which no color filter is formed. Similarly, the G color filter area 514 includes a first reflecting area 514a on which a corresponding color filter is formed with the first thickness, a second reflecting area 514b on which a corresponding color filter is formed with the second thickness, and a transmitting area 514c without a color filter. Likewise, the B color filter area 516 includes a first reflecting area 516a on which a corresponding color filter is formed with the first thickness, a second reflecting area 516b on which a corresponding color filter is formed with the second thickness, and a transmitting area 516c without a color filter. The black-and-white region 520 transmits white light, and does not include color filters.

As used herein, "four colors" refer to three color filters and a means of transmitting white light, i.e. either a white pixel or an absence of a color pixel. The alternative color filtering member 500, which has the intercepting region 530 and four colors, improves the brightness of an LCD apparatus. This improvement is partly due to a reduction of the surface area that is covered by the intercepting region 530. Another factor contributing to this improvement is the presence of the black-and-white region 520 that transmits light substantially without loss.

In this exemplary embodiment, the intercepting region 530 extends in the x-direction and a plurality of the intercepting regions 530 are arranged along the y-direction. However, the invention is not limited to the particular configuration shown in FIG. 6, and may be adapted to various other configurations of the colored regions 510 and the black-and-white regions 520. For example, the intercepting region 530 may have shapes other than a straight line, such as a curved shape or a zigzagging shape.

As shown in FIG. 7B, the intercepting region 530 partially overlaps with the neighboring colored regions 510, forming sloped portions near the overlapping regions. Frequently, light leakage occurs at these sloped portions near the pixel boundaries. This light leakage is highly undesirable, as it negatively affects the contrast ratio and deteriorates display quality.

FIG. 7A is a schematic view showing an LCD apparatus for reducing the light leakage near the pixel boundaries. FIG. 7B is a cross-sectional view showing the LCD apparatus shown in FIG. 7A.

Referring to FIGS. 7A and 7B, an LCD apparatus includes the alternative color filtering member 500 and an array member 600. The array member 600 includes an insulating layer 605, a gate line 610, an organic layer 620, a pixel electrode 630, reflecting plates 642 and 644 and a transmission window 650.

FIG. 7A shows an intercepting region 530 having a width W formed between two colored regions 510 and 510'. An imaginary line I extends between the two colored regions 510, 510', about halfway between the two colored regions 510, 510'. Currently, the intercepting region 530 is positioned so that a centerline that runs through the middle of the intercepting region 530 (i.e., the centerline is located W/2 from an edge of the intercepting region 530) approximately coincides with the imaginary line I. Thus, the intercepting region 530 is arranged substantially symmetrically with respect to the imaginary line. This symmetry does not exist in the invention. In the color filtering member 500 of the invention, the position of the intercepting region 530 is shifted in the direction in which the alignment layer is rubbed (i.e., the direction in which the liquid crystals are aligned), by a predetermined distance ΔT, to form an intercepting region 530'. By shifting the intercepting region 530, the intercepting region 530 is positioned near where the light is leaked, so that light leakage can be efficiently reduced. In FIG. 7A, the direction of rubbing is assumed to be along the y-direction.

To prevent light from leaking when the LCD apparatus is operating in a transmissive mode, the gate line 610 formed on the array member 600 is also shifted in the y-direction. The distance in which the gate line 610 is shifted does not necessarily equal ΔT. A person of ordinary skill in the art is able to determine the appropriate shifting distance. With the shifted gate line 610, the LCD apparatus is able to reduce the leakage of the internal light (or backlight).

Figure 8:
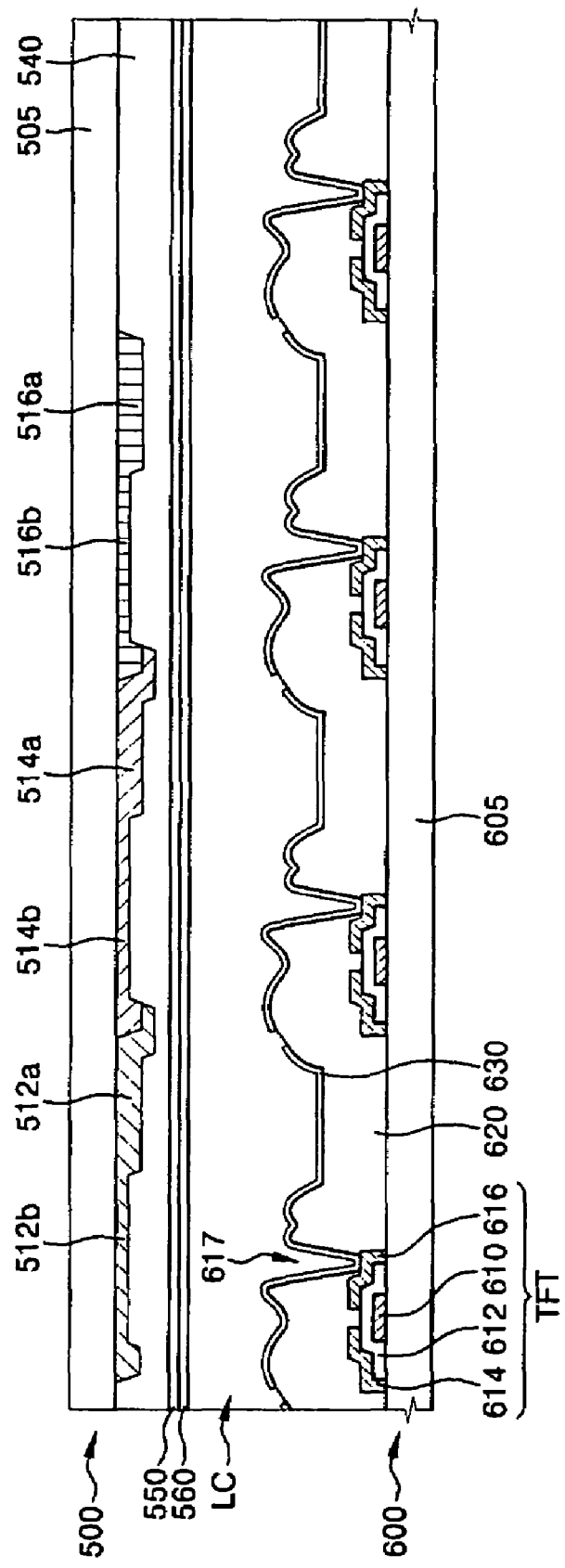
FIG. 8 is a cross-sectional view of an LCD apparatus according to another exemplary embodiment of the present invention.

FIG. 8 is a cross-sectional view showing an LCD apparatus according to another exemplary embodiment of the present invention. Particularly, the LCD apparatus shows a cross-section taken along the line A-A' of FIG. 6.

FIG. 8 shows an LCD apparatus including the alternative color filtering member 500, the alternative array member 600, a liquid crystal layer interposed between the color filtering member 500 and the array member 600, and an internal light source, such as a backlight assembly (not shown), disposed under the array member 600 so as to generate and provide light to the array member 600.

The color filtering member 500 includes a transparent substrate 505, a black matrix layer (not shown) formed on the transparent substrate 505, color filter layers 512a, 512b, 514a, 514b, 516a and 516b, an organic layer 540, an insulating layer 550, and a transparent electrode layer 560.

Particularly, the black matrix layer such as an intercepting region or a black mask is formed on the transparent substrate 505 in a matrix configuration so as to mask areas between R, G and B color filters adjacent to each other in the y-direction.

The color filters 512a, 512b, 514a, 514b, 516a and 516b are formed in areas defined by the black matrix layer and include one of R, G and B color filter patterns. Each of the color filters 512a, 512b, 514a, 514b, 516a and 516b has one of R, G and B colorants for coloring a transparent resin. The colorant may be a dye or a pigment. The colors of the color filters 512a, 512b, 514a, 514b, 516a and 516b are typically primary colors (RGB) or complementary colors, but may be adjusted to a particular application. The color filters 512a, 512b, 514a, 514b, 516a and 516b are formed by coating a photosensitive resin including a colorant, for example, such as the dye or pigment, over a substrate and patterning the photosensitive resin using a photolithography process.

The organic layer 540 protects the color filters 512a, 512b, 514a, 514b, 516a and 516b from various environmental elements and external forces and prevents the colorant from spreading to other parts. The organic layer 540 also planarizes the color filters 512a, 512b, 514a, 514b, 516a and 516b, as described above. The organic layer 540 includes a transparent resin such as an acrylic resin, an epoxy resin and so on.

The insulating layer 550 is formed on the organic layer 540. The insulating layer 550 includes a transparent metal oxide (e.g., $Ta_2O_5$, $ZrO_2$ or $TiO_2$) coated over the color filter. Preferably, the insulating layer 550 includes $Ta_2O_5$, or $Ta_2O_5$ mixed with one of $ZrO_2$, $TiO_2$ and $SiO_2$.

The transparent electrode layer 560 having a predetermined pattern is formed on the insulating layer 550.

Although not shown in FIG. 8, the color filtering member 500 may further include a transparent hardened passivation layer formed on the transparent electrode layer 560 so as to prevent a common electrode of the color filtering member 500 and a pixel electrode of the array member 600 from being shorted due to impurities. The transparent hardened passivation layer includes $SiO_2$, $TiO_2$ and so on. A first alignment layer (not shown) including a polyimide resin is formed on the transparent hardened passivation layer and rubbed through a rubbing process.

The array member 600 includes a first insulating layer 605, a plurality of gate lines formed on the first insulating layer 605, a plurality of data lines insulated from and intersected with the gate lines, a plurality of pixels formed in a matrix configuration. Each of the pixels has a TFT formed on an area surrounding with the gate and data lines and connected to corresponding gate and data lines. The array member 600 is combined with the color filtering member 500 so as to receive the liquid crystal LC therebetween.

Particularly, a gate pattern including a single metal layer or a double metal layer having chromium (Cr), aluminum (Al), molybdenum (Mo) or molybdenum tungsten (MoW) is formed on the first insulating substrate 605. The gate pattern includes a gate line extended in a first direction, a gate pad (not shown) connected to end of the gate line so as to receive a scan signal from an external and provide the scan signal to the gate line and a gate electrode 610 of the TFT.

The array member 600 includes a gate-insulation layer (not shown) including an inorganic material, for example, such as a silicon nitride, and formed on the gate line and the first insulating layer 605. An active pattern 612 including polycrystalline silicon is formed on the gate-insulation layer corresponding to the gate electrode 610.

The array member 600 includes a data pattern that includes a metal layer formed on the active pattern 612 and the gate-insulation layer. The data pattern includes a source electrode 614 overlapping a first area of the active pattern 612, a drain electrode 616 overlapping a second area of the active pattern 612, a data line connected to the source electrode 614 and extending in a second direction substantially perpendicular to the first direction and a data pad (not shown) connected to an end of the data line so as to receive an image signal from an external source and provide the image signal to the TFT.

The array member 600 includes an organic layer 620 formed on the data line and the gate-insulation layer and provided with a via-hole 617 so as to partially expose the drain electrode 616.

To control the liquid crystal LC, the array member 600 includes a pixel electrode 630 formed on the organic layer 620 and connected to the drain electrode 616 through the via-hole 617. The pixel electrode 630 often includes ITO or IZO.

The pixel electrode 630 receives the image signal from the TFT and generates an electric field with the common electrode (not shown) of the color filtering member 500. The pixel electrode 630 is formed within a pixel area defined by the gate and the data lines. An edge of the pixel electrode 630 overlaps the gate lines and the data lines, thereby obtaining a great opening ratio of the pixel electrode 630.

Although not shown in FIG. 8, a reflecting layer (not shown) may be formed on the pixel electrode 630 so as to define a reflecting area and a transmitting area. The reflecting layer is provided with a light-transmitting window and the light-transmitting window is shifted in a predetermined direction in consideration of the gate lines.

In the above exemplary embodiments, the color filtering member 500 having a first alignment layer formed along the outer portion thereof has been described. In the color filtering member 500, the intercepting region is shifted to a direction in which the first alignment layer is rubbed.

In addition, the array member 600 may further include a second alignment layer formed along an outer portion thereof. In the array member 600, the intercepting region is also shifted in a direction that corresponds to the direction in which the second alignment layer is rubbed.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A color filtering device for a display device, comprising:
    a substrate;
    a plurality of colored layers formed on the substrate and separated from each other, each colored layer including a plurality of color filters overlapped with each other;
    a colorless layer covering upper surfaces of the colored layers and filling a vacant region between two adjacent colored layers so that a substantially white light is capable of passing through the substrate and the colorless layer in the vacant region; and
    a planarizing layer formed on the colorless layer.

2. The device of claim 1, wherein the colored layers comprises:
    a first colored layer;
    a second colored layer spaced apart from the first colored layer in a first direction so that the vacant region is disposed between the first colored layer and the second colored layer; and
    a third colored layer spaced apart from the first colored layer in a second direction substantially perpendicular to the first direction.

3. The device of claim 2, further comprising an intercepting layer positioned between the first colored layer and the third colored layer.

4. The device of claim 3 further comprising: a white pixel formed in the colorless gap, the white pixel having a thickness that is approximately equal to a thickness of the first color filter, wherein the white pixel partially overlaps the first colored region and the second colored region; and
    a second planarizing layer deposited on the first planarizing layer.

5. The device of claim 3 further comprising an alignment layer formed on the planarizing layer, wherein the alignment layer is rubbed in a direction from the first colored layer toward the third colored region and the first colored layer.

6. The device of claim 3, wherein the first and the third colored layers have different lengths, wherein the length is the distance from the intercepting layer to an edge of the colored layer that is farthest from the intercepting layer.

7. The device of claim 1, wherein the planarizing layer comprises a different material from the colorless layer.

8. A display device comprising:
    a first substrate;
    a plurality of colored layers formed on the first substrate and separated from each other;
    a colorless layer covering upper surfaces of the colored layers and filling a vacant region between two adjacent colored layers so that a substantially white light is capable of passing through the substrate and the colorless layer in the vacant region;
    a planarizing layer formed on the colorless layer;
    a second substrate coupled to the first substrate; signal lines and transistors formed on the second substrate; and a liquid crystal layer interposed between the first substrate and the second substrate,
    wherein each of the colored layers includes a plurality of color filters overlapped with each other, and is overlapped with a plurality of pixel electrodes formed on the second substrate and independently controlled by the transistors, the pixel electrodes respectively overlapping with the color filters.

9. The device of claim 8, wherein each of the colored layers includes a light transmitting area and a light reflecting area.

10. The device of claim 9, wherein the second substrate further comprises a reflecting plate corresponding to the light reflecting area.

11. The device of claim 8, wherein the colored layers comprise:
    a first colored layer;
    a second colored layer spaced apart from the first colored layer in a first direction so that the vacant region is disposed between the first colored layer and the second colored layer; and
    a third colored layer spaced apart from the first colored layer in a second direction substantially perpendicular to the first direction.

12. The device of claim 11, further comprising an intercepting layer formed on the first substrate and positioned between the first colored layer and the third colored layer.

13. The device of claim 11 further comprising an alignment layer positioned between the liquid crystal layer and the first substrate, wherein the alignment layer is rubbed from the first colored layer toward the third colored layer.

14. The device of claim 13, wherein the signal lines comprise a gate line extending in the same direction as the intercepting layer but is not centered with respect to the intercepting layer.

15. The device of claim 13, wherein the first and the third colored layers have different lengths, wherein the length is the distance from the intercepting layer to an edge of the colored layer that is farthest from the intercepting layer.

16. The device of claim 8, wherein the colorless layer comprises an organic material.

17. The device of claim 16, wherein the planarizing layer comprises a different material from the colorless layer.

18. The device of claim 8 further comprising:
    an electrode layer formed on the planarizing layer; and
    at least one of a passivation layer and an alignment layer formed on the electrode layer.

19. A method of making a color filtering device, the method comprising:
    forming a plurality of colored layers separated from each other on a substrate, each colored layer including a plurality of color filters overlapped with each other;
    forming a colorless layer covering upper surfaces of the colored layers and filling a vacant region between two adjacent colored layers so that a substantially white light is capable of passing through the substrate and the colorless layer in the vacant region;

forming a planarizing layer formed on the colorless layer.

20. The method of claim 19 further comprising forming an intercepting layer formed on the substrate, wherein the colored layers comprises:
   - a second colored layer spaced apart from the first colored layer in a first direction so that the vacant region is disposed between the first colored layer and the second colored layer; and
   - a third colored layer spaced apart from the first colored layer in a second direction substantially perpendicular to the first direction,
   - wherein the first and the third colored layers have different lengths, wherein the length is the distance from the intercepting layer to an edge of the colored layer that is farthest from the intercepting layer.

21. A color filtering device for a display device, comprising:
   - a substrate;
   - a first colored region formed on the substrate;
   - a second colored region formed on the substrate, wherein the second colored region is positioned a predetermined distance away from the first colored region in a first direction;
   - a colorless gap between the first and second colored regions to function as a black-and-white region for transmitting white light;
   - a third colored region formed on the substrate, wherein the third colored region is positioned away from the first colored region in a second direction and the first and third colored region has substantially the same color;
   - an intercepting region positioned between the first colored region and the third colored region, wherein the first and the third colored regions have different lengths, wherein the length is the distance from the intercepting region to an edge of the colored region that is farthest from the intercepting region; and
   - a first planarizing layer deposited in the colorless gap and on the first and the second colored regions.

* * * * *